United States Patent [19]
Kosaka et al.

[11] Patent Number: 6,133,406
[45] Date of Patent: Oct. 17, 2000

[54] PROCESS FOR PREPARING AROMATIC POLYAMIDES

[75] Inventors: Masaki Kosaka; Yukio Muranaka; Kenji Wakatsuru, all of Yamaguchi-ken, Japan

[73] Assignee: Mitsui Chemicals, Inc., Tokyo, Japan

[21] Appl. No.: 09/195,196

[22] Filed: Nov. 18, 1998

[30] Foreign Application Priority Data

Nov. 18, 1997 [JP] Japan .................................. 9-317471

[51] Int. Cl.$^7$ .......................... C08G 73/10; C08G 69/26; C08G 69/28; C08G 69/30
[52] U.S. Cl. .......................... 528/310; 528/170; 528/314; 528/322; 528/332; 528/335; 528/336
[58] Field of Search ...................... 528/170, 310, 528/322, 314, 332, 335, 336

[56] References Cited

U.S. PATENT DOCUMENTS 5,849,826  12/1998  Ogo et al. ............................. 528/338

FOREIGN PATENT DOCUMENTS

0744431 A2  11/1996  European Pat. Off. .
8-311198  11/1996  Japan .

*Primary Examiner*—P. Hampton-Hightower
*Attorney, Agent, or Firm*—Birch, Stewart, Kolasch & Birch, LLP

[57] ABSTRACT

The present invention relates to a process for preparing an aromatic polyamide which comprises:

(A) a dicarboxylic acid component unit comprising 30 to 100 mol % of a terephthalic acid component unit, and, as required, 0 to 70 mol % of a cyclic dicarboxylic acid component unit other than the terephthalic acid and, as required, 0 to 15 mol % of an aliphatic dicarboxylic acid having 7 to 20 carbon atoms; and (B) a diamine unit comprising 50 to 100 mol % of a component unit derived from an aliphatic alkylene diamine having 4 to 25 carbon atoms, and 0 to 50 mol % of a component unit derived from an alicyclic diamine having 3 to 25 carbon atoms; said process comprising:

a step (i) of preparing a solid low-degree condensation product having an intrinsic viscosity $[\eta]_1$ of from 0.05 to 0.2 dl/g is prepared by the polycondensation reaction of the dicarboxylic acid with the diamine;

a step (ii) of solid-phase polymerizing said low-degree condensation product at a temperature of not higher than 195° C. to prepare a solid-phase polymerized product having having an intrinsic viscosity $[\eta]_2$ satisfying the following relationship [I], $[\eta]_2 - [\eta]_1 = 0.02$ to 0.1 dl/g [I]

and;

a step (iii) of further solid-phase polymerizing said solid-phase polymerized product to obtain an aromatic polyamide having an intrinsic viscosity $[\eta]_3$ of from 0.15 to 1.1 dl/g and a ratio $[\eta]_3/[\eta]_2$ of not smaller than 1.0.

5 Claims, 1 Drawing Sheet

PROCESS FOR PREPARING AROMATIC POLYAMIDES

BACKGROUND OF THE INVENTION

1. Field of the Invention

The present invention relates to a process for reparing aromatic polyamides. More specifically, the nvention relates to a process for economically and fficiently preparing aromatic polyamides.

2. Prior Art

Aliphatic polyamides (nylons) such as nylon 6, nylon 66 and nylon 610 have heretofore been widely used as engineering plastics in various fields. The aliphatic polyamides can be favorably molded but have low glass transition temperatures (e.g., nylon 66 has a glass transition temperature of generally about 60° C.) and, hence, exhibit insufficient heat resisting property.

In order to solve these problems, the present inventors have proposed an aromatic polyamide including (a) a dicarboxylic acid component unit comprising 60 to 100 mol % of a component unit derived from a terephthalic acid, and 0 to 40 mol % of a component unit derived from an aromatic dicarboxylic acid other than terephthalic acid, and (b) a component unit derived from an alkylene diamine, the aromatic polyamide having an intrinsic viscosity [η] of from 0.5 to 3.0 dl/g as measured in the concentrated sulfuric acid at 30° C. (see Japanese Unexamined Patent Publication (Kokai) No. 53536/1984). The above aromatic polyamides exhibit excellent heat resisting property and mechanical properties, but have high melting points. When they are prepared according to the traditional method of preparing aliphatic polyamides, therefore, the aromatic polyamide is, in some cases, decomposed in the step of production, and the hue of the aromatic polyamide is lowered.

In order to prepare the aromatic polyamides, therefore, the present inventors have proposed a method according to which a polyamide having a low molecular weight (low-degree polyamide) is, first, prepared from a dicarboxylic acid and a diamine and, then, the low-degree polyamide (the polyamide obtained by the polymerization with low polymerization degree) is further polymerized so that the resulting polyamide possess a desired molecular weight (see Japanese Unexamined Patent Publication (Kokai) No. 196625/1988).

In order to polymerize the low-degree polyamide so that the resulting polyamide possess a desired molecular weight, furthermore, Japanese Unexamined Patent Publications (Kokai) Nos. 228693/1995 and 311198/1996 disclose methods in which a solid low-degree condensation product (the product obtained by the condensation with low condensation degree) is solid-phase polymerized in vacuum or in a carrier gas stream, followed by the melt polymerization.

However, the present inventors have discovered the fact that especially when an aromatic polyamide containing a terephthalic acid component further contains a component unit derived from a cyclic dicarboxylic acid, the following problem occurs in the solid-phase polymerization. Namely, the problem is that a low-degree condensation product give agglomerates probably due to the water of condensation formed during the solid-phase polymerization, and according to the conventional preparation method, therefore, the solid-phase polymerization does not efficiently proceed. It has therefore been urged to provide a method capable of more efficiently preparing an aromatic polyamide containing a cyclic dicarboxylic acid component unit. The solid-phase polymerization does not efficiently proceed, either, when the aromatic polyamide contains a component unit derived from a long-chain diamine having 4 to 25 carbon atoms. It has therefore been urged to provide a method capable of efficiently preparing the aromatic polyamides containing such a component unit.

SUMMARY OF THE INVENTION

The present invention is to solve the above-mentioned problems inherent in the prior art, and its object is to provide a method which is capable of smoothly conducting the solid-phase polymerization while preventing the melt-adhesion of a low-degree condensation product at the time of preparing an aromatic polyamide through the step of solid-phase polymerization.

According to the present invention, there is provided a process for preparing an aromatic polyamide which comprises:

(A) a dicarboxylic acid component unit comprising 30 to 100 mol % of a terephthalic acid component unit, and, as required, 0 to 70 mol % of a cyclic dicarboxylic acid component unit other than the terephthalic acid and, as required, 0 to 15 mol % of an aliphatic dicarboxylic acid having 7 to 20 carbon atoms; and (B) a diamine unit comprising 50 to 100 mol % of a component unit derived from an aliphatic alkylene diamine having 4 to 25 carbon atoms, and 0 to 50 mol % of a component unit derived from an alicyclic diamine having 3 to 25 carbon atoms; said process comprising:

a step (i) of preparing a solid low-degree condensation product having an intrinsic viscosity $[\eta]_1$ of from 0.05 to 0.2 dl/g by the polycondensation reaction of the dicarboxylic acid with the diamine;

a step (ii) of solid-phase polymerizing said low-degree condensation product at a temperature of not higher than 195° C. to prepare a solid-phase polymerized product having an intrinsic viscosity $[\eta]_2$ satisfying the following relationship [I], $[\eta]_2 - [\eta]_1 = 0.02$ to $0.1$ dL/g [I]

and;

a step (iii) of further solid-phase polymerizing said solid-phase polymerized product to obtaine an aromatic polyamide having an intrinsic viscosity $[\eta]_3$ of from 0.15 to 1.1 dl/g and a ratio $[\eta]_3/[\eta]_2$ of larger than 1.0.

In the present invention, by melt-polymerizing (step (iv)) the polyamide obtained in the step (iii), an aromatic polyamide having an intrinsic viscosity $[\eta]_4$ of from 0.8 to 2.5 dl/g can be obtained.

In the above-mentioned step (iii), furthermore, the solid-phase polymerization may be conducted at a temperature of from 205 to 280° C.

According to the present invention, a particle layer is formed by using the solid low-degree condensation product obtained in the step (i), an inert gas is supplied at a position 0 to 0.8 times as high as the height h of the particle layer at a rate of from 0.1 to 10 Nm³/hr per kilogram of the low-degree condensation product and at the same time, the solid-phase polymerization in the step (ii.) can be carried out at a temperature of not higher than 195° C. to prepare a solid-phase polymerized product having an intrinsic viscosity $[\eta]_2$ satisfying the above-mentioned relationship [I].

According to the present invention, furthermore, a particle layer is formed by using the solid-phase polymer obtained in the step (ii), an inert gas is supplied at a position 0 to 0.8 times as high as the height h of the particle layer at a rate of from 0.1 to 10 Nm³/hr per kilogram of the solid-phase polymerized product and at the same time, the further solid-phase polymerization in the step (iii) can be carried out to prepare an aromatic polyamide having an intrinsic viscosity $[\eta]_3$ of from 0.15 to 1.1 dl/g.

In the present invention, the solid-phase polymerizations in the steps (ii) and (iii) may be both conducted batchwisely or continuously, or may be conducted batchwisely and continuously in combination.

In conducting the solid-phase polymerization in the steps (ii) and (iii) according to the present invention, it is desired that a low-degree condensation product of an aromatic polyamide is continuously supplied to a region where the solid-phase polymerization of the step (ii) is conducted and a polyamide that is obtained is continuously discharged from a region where the solid-phase polymerization of the step (iii) is conducted.

DETAILED DESCRIPTION OF THE INVENTION

Figure 1:
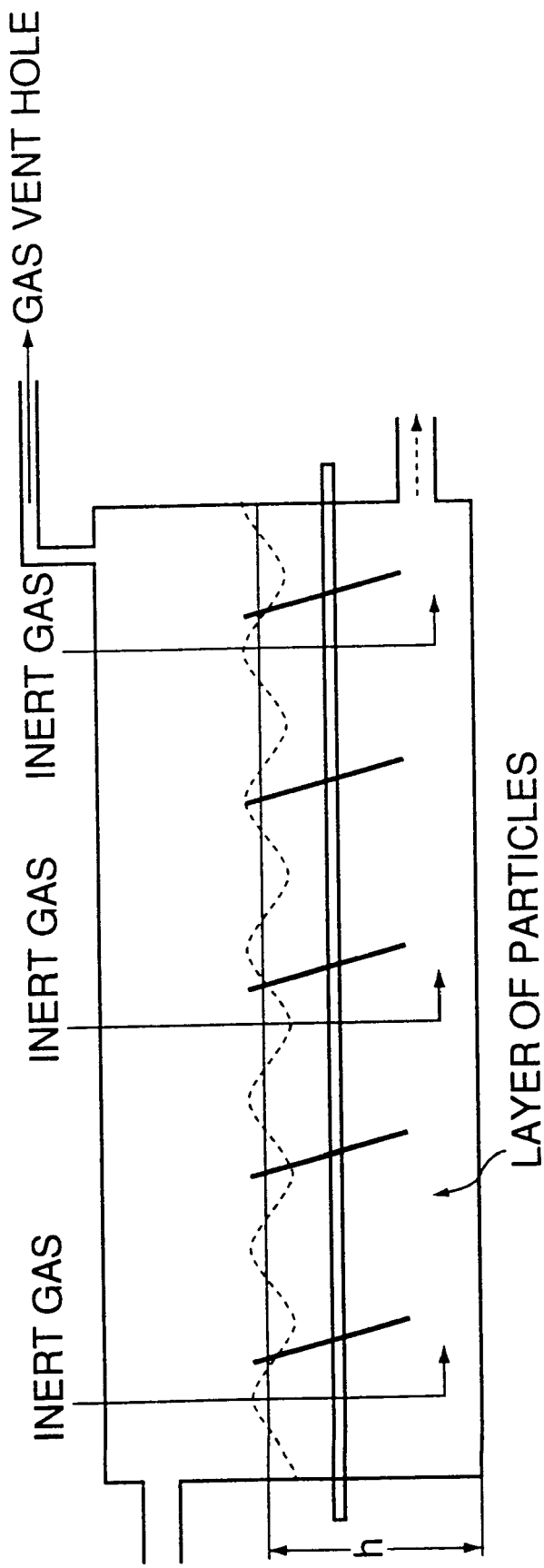
FIG. 1 is a cross-sectional side view of a solid-phase polymerization reaction vessel employed in a process for preparing an aromatic polyamide according to an embodiment of the present invention, showing a supplying position and a method for supplying inert gas.

A process for preparing an aromatic polyamide according to the present invention will now be concretely described.

Preparation of a Low-degree Condensation Product of an Aromatic Polyamide

The present invention, first, prepares a low-degree condensation product of an aromatic polyamide comprising a component unit derived from a dicarboxylic acid and a component unit derived from a diamine.

<Low-degree condensation product of an aromatic polyamide>

The low-degree condensation product of an aromatic polyamide includes:

(A) a dicarboxylic acid component unit comprising 30 to 100 mol % of a terephthalic acid component unit, and, as required, 0 to 70 mol % of a cyclic dicarboxylic acid component unit other than the terephthalic acid and, as required, 0 to 15 mol % of an aliphatic dicarboxylic acid having 7 to 20 carbon atoms; and (B) a diamine unit comprising 50 to 100 mol % of a component unit derived from an aliphatic alkylene diamine having 4 to 25 carbon atoms, and 0 to 50 mol % of a component unit derived from an alicyclic diamine having 3 to 25 carbon atoms.

This low-degree condensation product includes a recurring unit, which is expressed by the following formula [1], constituted by a component unit [a-1] derived from a terephthalic acid and a component unit [b] derived from an alkylene diamine having 4 to 25 carbon atoms,

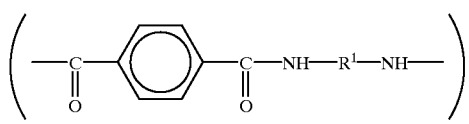

wherein $R^1$ is an alkylene group having 4 to 25 carbon atoms in the component unit derived from the aliphatic alkylene diamine.

The dicarboxylic acid component units in the low-degree condensation product need not all be the recurring unit expressed by the above-mentioned formula [1] but may contain a component unit [a-2] in which part of the component unit [a-1] derived from the terephthalic acid is derived from a cyclic dicarboxylic acid other than the terephthalic acid.

Here, the cyclic dicarboxylic acid means a dicarboxylic acid having an aromatic ring skeleton or an alicyclic skeleton. In the present invention, a dicarboxylic acid having an aromatic ring skeleton is preferable.

Examples of the cyclic dicarboxylic acid other than the terephthalic acid include isophthalic acid, 2-methylterephthalic acid, naphthalenedicarboxylic acid, diphenoxyethanedicarboxylic acid, cyclohexanedicarboxylic acid, and 1,3-cyclopentanedicarboxylic acid. These component units may be included in a combination of two or more kinds.

In the present invention, when the low-degree condensation product includes the component unit [a-2] derived from a cyclic dicarboxylic acid other than the terephthalic acid, it is desired that this component unit is, particularly, the one derived from the isophthalic acid.

When the low-degree condensation product includes the component unit derived from the isophthalic acid as a component unit derived from the cyclic dicarboxylic acid other than the terephthalic acid, the aromatic polyamide obtained according to the present invention includes a recurring unit represented by the following formula [2],

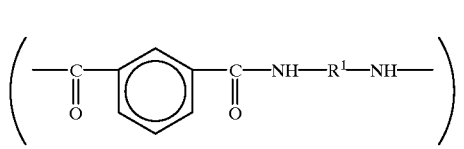

wherein $R^1$ is an alkylene group having 4 to 25 carbon atoms in the component unit derived from the aliphatic alkylene diamine.

In the present invention, the low-degree condensation product may include a component unit [a-3] derived from an aliphatic dicarboxylic acid having 7 to 20 carbon atoms in addition to the terephthalic acid and as required, the cyclic dicarboxylic acid other than the terephthalic acid. As the aliphatic dicarboxylic acid having 7 to 20 carbon atoms, there can be exemplified an azelaic acid, a sebacic acid and the like acids. The sebacic acid is particularly preferred as the component unit.

When the low-degree condensation product includes the component unit derived from the aliphatic dicarboxylic acid having 7 to 20 carbon atoms, the aromatic polyamide obtained according to the present invention includes a recurring unit represented by the following formula [3],

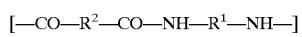

wherein $R^1$ is as defined above, and $R^2$ is an alkylene group having 5 to 18 carbon atoms in the component unit derived from the aliphatic dicarboxylic acid.

When the aromatic polyamide obtained by the present invention includes a unit (the above [3]) of an aliphatic dicarboxylic acid having 7 to 20 carbon atoms, it is desired that this unit is included as the third component together with a unit of terephthalic acid and a unit of a cyclic dicarboxylic acid other than terephthalic acid.

As the above-mentioned low-degree condensation product of an aromatic polyamide, there can be considered the following combinations:

(1) TA/IA//HMDA
(2) TA/IA/SA//HMDA
(3) TA//HMDA/MPMDA where TA stands for a terephthalic acid, IA stands for an isophthalic acid, SA stands for a sebacic acid, HMDA stands for a hexamethylene diamine (1,6-diaminohexane), and MPMDA stands for a 2-methylpentamethylene diamine (1,5-diamino-2-methylpentane).

The component unit derived from the aliphatic alkylene diamine is derived from an aliphatic alkylene diamine having 4 to 25 carbon atoms and, preferably, 6 to 18 carbon atoms. The aliphatic alkylene diamine may be either a straight-chain alkylene diamine or a branched-chain alkylene diamine.

Concrete examples of the alkylene diamine include straight-chain alkylene diamines such as 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane; and branched-chain alkylene diamines such as 1,4-diamino-1,1-dimethylbutane, 1,4-diamino-2-methylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,5-diamino-2-methylpentane, 1,2-diamino-1-butylethane, 1,6-diamino-2-methylhexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2-methylheptane, 1,7-diamino-2,4-dimethylheptane, 1,7-diamino-2,3-dimethylheptane, 1,7-diamino-2,4-dimethylheptane, 1,7-diamino-2,5-dimethylheptane, 1,7-diamino-2,2-dimethylheptane, 1,8-diamino-2-methyloctane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, and 1,9-diamino-5-methylnonane.

In the present invention, the diamine component unit (b) in the low-degree condensation product is preferably derived from a straight-chain alkylene diamine among those of the straight-chain alkylene diamines and the branched-chain alkylene diamines and, particularly, derived from a straight-chain alkylene diamine such as 1,6-diaminohexane, 1,8-diaminooctane, 1.9-diaminononane, 1,10-diaminodecane, and 1,12-diaminododecane. These straight-chain alkylene diamines may be used in a single kind or in combination. Or, the straight-chain alkylene diamine may be used in combination with the branched-chain alkylene diamine.

The diamine component unit in the low-degree condensation product may include the component unit [b-2] derived from the alicyclic diamine besides the component unit [b-1] derived from the non-cyclic aliphatic alkylene diamine above.

The component unit derived from the alicyclic diamine is derived from an alicyclic diamine having 3 to 25 carbon atoms and, preferably, 6 to 18 carbon atoms, and having at least one alicyclic hydrocarbon ring. Concrete examples of the alicyclic diamine include 1,3-diaminocyclohexane, 1,4-diaminocyclohexane, 1,3-bis(aminomethyl)cyclohexane, 1,4-bis(aminomethyl)cyclohexane, isophorone diamine, piperadine, 2,5-dimethyl piperadine, bis(4-aminocyclohexyl)methane, bis(4-aminocyclohexyl)propane, 4,4'-diamino-3,3'-dimethyldicyclohexyl propane, 4,4'-diamino-3,3'-dimethyldicyclohexylmethane, 4,41-diamino-3,3'-dimethyl-5,5'-dimethyldicyclohexylmethane, 4,4'-diamino-3,3'-dimethyl-5,5'-dimethyldicyclohexylpropane, α, α'-bis(4-aminocyclohexyl)-p-diisopropylbenzene, α, α'-bis(4-aminocyclohexyl)-m-diisopropylbenzene, α, α'-bis(4-aminocyclohexyl)-1,4-cyclohexane, α, α'-bis(4-aminocyclohexyl)-1,3-cyclohexane, and the like.

Among these alicyclic diamines, the present invention preferably uses 1,3-bis(aminomethyl)cyclohexane, bis(4-aminocyclohexyl)methane, 1,3-bis(aminocyclohexyl)methane, 1,3-bis(aminomethyl)cyclohexane, 4,4'-diamino-3,3'-dimethyldicyclohexylmethane, or the like and, particularly, bis(4-aminocyclohexyl)methane, 1,3-bis(aminocyclohexyl)methane or 1,3-bis(aminomethyl)cyclohexane. These alicyclic diamines may be used in a single kind or in combination.

According to the present invention, it is desired that the content of the component unit [a-1] derived from the terephthalic acid in the whole dicarboxylic acid component units (100 mol %) constituting the low-degree condensation product, is from 30 to 100 mol %, preferably, from 40 to 80 mol % and, more preferably, from 45 to 75 mol %, and the content of the component unit [a-2] derived from the cyclic dicarboxylic acid other than the terephthalic acid, is from 0 to 70 mol %, preferably, from 0 to 60 mol % and, more preferably, from 0 to 55 mol % and, further preferably, from 0 to 30 mol %. In the particularly preferred embodiment, the component unit [a-2] is contained in an amount of from 1 to 70 mol %, preferably, from 10 to 60 mol %, particularly preferably, from 15 to 55 mol %.

Furthermore, the content of the component unit derived from the aliphatic dicarboxylic acid having 7 to 20 carbon atoms in the whole dicarboxylic acid component units constituting the low-degree condensation product, is from 0 to 15 mol %, preferably, from 0 to 12 mol % and, more preferably, from 0 to 10 mol %. In the particularly preferred embodiment, its content is from 0 mol %. In another preferred embodiment, its content is from 1 to 10 mol %.

It is further desired that the content of the component unit [b-1] derived from the non-cyclic aliphatic alkylene diamine in the whole diamine component units (100 mol %) constituting the low-degree condensation product, is from 50 to 100 mol %, preferably, from 60 to 100 mol % and, more preferably, from 70 to 100 mol %, and the content of the component unit [b-2] derived from the alicyclic diamine is from 0 to 50 mol %, preferably, from 0 to 40 mol % and, more preferably, from 0 to 30 mol %.

<Polycondensation reaction of dicarboxylic acid with diamine>

In the present invention, nearly one mol of the diamine per one mol of the dicarboxylic acid are mixed together, and are heated and are polycondensation-reacted in the presence of water and a phosphor compound, in order to prepare a low-degree condensation product of an aromatic polyamide. A salt of dicarboxylic acid and a salt of diamine may be used instead of the dicarboxylic acid and the diamine.

As the phosphor compound, there can be used phosphoric acid, phosphorous acid, hydrophosphorous acid, salt thereof or an ester compound thereof.

Examples of the phosphate include potassium phosphate, sodium phosphate, calcium phosphate, magnesium phosphate, manganese phosphate, nickel phosphate and cobalt phosphate. Examples of the phosphoric ester include methyl phosphate, ethyl phosphate, isopropyl phosphate, butyl phosphate, hexyl phosphate, isodecyl phosphate, octadecyl phosphate, decyl phosphate, stearyl phosphate and phenyl phosphate. Examples of the phosphite includes potassium phosphite, sodium phosphite, calcium phosphite, magnesium phosphite, manganese phosphite, nickel phosphite and cobalt phosphite. Examples of the phosphorous ester include methyl phosphite, ethyl phosphite, isopropyl phosphite, butyl phosphite, hexyl phosphite, isodecyl phosphite, octadecyl phosphite, decyl phosphite, stearyl phosphite and phenyl phosphite. Examples of the hydrophosphite include potassium hydrophosphite, sodium hydrophosphite, calcium hydrophosphite, vanadium hydrophosphite, magnesium hydrophosphite, manganese hydrophosphite, nickel hydrophosphite and cobalt hydrophosphite. These phosphor compounds may be used in a single kind or in a combination.

It is desired that the phosphor compound is used at a ratio of, usually, from 0.01 to 5 mol % and, preferably, from 0.02 to 2 mol % with respect to the dicarboxylic acid. It is desired that the water is used at a ratio of from 0 to 20% by weight with respect to the total amount of dicarboxylic acid, diamine and phosphor compound.

In conducting the polycondensation reaction of the dicarboxylic acid with the diamine, a monocarboxylic acid or a monoamine (which are terminating agents) may be added as required. It is desired that the monocarboxylic acid or the monoamine is added in an amount of from 0 to 3 mol % with respect to the dicarboxylic acid or the diamine.

The polycondensation reaction of the dicarboxylic acid with the diamine is conducted, usually, at a temperature of from 200 to 290° C. and, preferably, from 220 to 280° C. for a period of, usually, from 0.3 to 5 hours and, preferably, from 0.4 to 3 hours.

The reaction is carried out under normal pressure or under an elevated pressure. Usually, however, it is desired that the reaction is conducted under an elevated pressure. In this case, the reaction pressure is, usually, from 20 to 60 kg/cm$^2$ and, preferably, from 25 to 50 kg/cm$^2$. It is further desired that the reaction is conducted in an inert gas atmosphere.

Through the above-mentioned reaction, the dicarboxylic acid and the diamine are polycondensed to form a solid low-degree condensation product of an aromatic polyamide. It is desired that the obtained solid low-degree condensation product of an aromatic polyamide exhibits an intrinsic viscosity [η]$_1$ in the concentrated sulfuric acid at 30° C. of from 0.05 to 0.2 dl/g, preferably, from 0.08 to 0.2 dl/g and, more preferably, from 0.12 to 0.2 dl/g. When the viscosity lies within this range, the low-degree condensation product can be easily taken out from the reaction vessel. Besides, the low-degree condensation product little adheres to the walls or to the discharge port, and does not deteriorate the productivity. The viscosity lying within this range is preferred particularly when the solid-phase polymerization is continuously executed. In this case, the solid-phase polymerization can be stably continued for an extended period of time.

The solid low-degree condensation product of an aromatic polyamide is obtained by, for example, flushing the obtained low-degree condensation product of an aromatic polyamide under the atmospheric pressure so that it is solidified and, as required, by pulverizing it into a suitable size.

There is no particular limitation on the shape and size of the solid low-degree condensation product of an aromatic polyamide provided the product that is obtained exhibits desired properties. In general, however, it is desired that the low-degree condensation product of an aromatic polyamide has a maximum particle diameter of not larger than 30 mm and, preferably, not larger than 20 mm, and an average particle diameter of from 0.1 to 10 mm and, preferably, from 0.2 to 5 mm.

The particle diameter was found by measuring a maximum length from the particle image relying on the Pythagoras' method. Concretely speaking, the length of the particle image sandwiched by two parallel lines was measured in the horizontal direction and in the vertical direction, and the particle diameter was calculated from the following formula, $$\text{Particle diameter }(d)=((\text{length in the horizontal direction})^2+(\text{length in the vertical direction})^2)^{0.5}$$

The diameters of more than 100 particles were measured, and the average particle diameter was weight-averaged according to the following formula, $$\text{Average particle diameter}=\Sigma nd^4/\Sigma nd^3$$

wherein n is the number of the particles, and d is the particle diameter.

According to the present invention, furthermore, the water contained in the solid low-degree condensation product of an aromatic polyamide may be removed to adjust the degree of crystallization of the low-degree condensation product of the aromatic polyamide. For example, the water contained in the low-degree condensation product of an aromatic polyamide may be decreased to be 5000 ppm or less and, preferably, 3000 ppm or less, and the degree of crystallization may be adjusted to be not lower than 20%.

The water can be removed from the low-degree condensation product of an aromatic polyamide and the degree of crystallization can be adjusted by heating the low-degree condensation product of an aromatic polyamide at a temperature lower than a temperature of heating in the step of solid-phase polymerization that will be described later. For example, the low-degree condensation product of an aromatic polyamide may be heated at a temperature of from 50 to 170° C., preferably, from 100 to 170° C. and, more preferably, from 110 to 170° C.

Solid-phase Polymerization of Low-degree Condensation Product of an Aromatic Polyamide <First solid-phase polymerization (solid-phase polymerization of (ii))

Next, in the present invention, the obtained solid low-degree condensation product of an aromatic polyamide is heated at a temperature of not higher than 195° C. and, preferably, at 175 to 195° C. to effect the first solid-phase polymerization reaction in order to obtain a solid-phase polymer. Here, the low-degree condensation product of an aromatic polyamide is held in the above temperature range, generally, for more than 30 minutes and, preferably, for 30 to 360 minutes.

Within this range, the low-degree condensation product does not give agglomerate during the solid-phase polymerization or the operation is not interrupted by any other cause.

The first solid-phase polymerization reaction can be executed by either the continuous method or the batch method. The apparatus that is used may be either the vertical type or the lateral type and may further be the stationary type, rotary type or the stirring type. It is particularly preferred that the first solid-phase polymerization reaction is continuously carried out.

It is desired that the solid-phase polymer obtained through the first solid-phase polymerization reaction has an intrinsic viscosity $[\eta]_2$ satisfying a relationship, $$[\eta]_2-[\eta]_1=0.02 \text{ to } 0.1 \text{ dl/g}$$

and preferably, $$[\eta]_2-[\eta]_1=0.02 \text{ to } 0.08 \text{ dl/g}$$

Within this range, the melt-adhesion does not take place in the next solid-phase polymerization (iii), and the operation can be conducted with ease.

In the first solid-phase polymerization, furthermore, it is desired that the water of condensation is formed in an amount of not smaller than 2 g, preferably, in an amount of from 2 to 15 g and, more preferably, in an amount of from 2 to 10 g per a kilogram of the low-degree condensation product of an aromatic polyamide of before being heated.

The first solid-phase polymerization reaction can be conducted either in vacuum or in a gas stream. It is, however, particularly preferred to conduct the first solid-phase polymerization reaction in an inert gas stream such as of nitrogen gas. It is, particularly, desired that the particle layer is formed of a solid low-degree condensation product, the inert gas is fed from a position from 0 to 0.8 times as high and, preferably, from 0 to 0.5 times as high as the height h of the particle layer at a rate of 0.1 to 10 Nm³/hr and, preferably, at a rate of 0.14 to 10 Nm³/hr per kilogram of the low-degree condensation product to carry out the first solid-phase polymerization reaction.

The height h of the particle layer is defined as described below. Referring to FIG. 1, the solid-phase polymerization reaction vessel is opened, particles of the solid low-degree condensation product of an aromatic polyamide are fed in an amount suited for carrying out the operation at normal temperature under the atmospheric pressure, and the height h of the particle layer is measured with the bottom of the reaction vessel having a gas feed port as a reference (h=0) in a state where the inert gas is permitted to pass through in a predetermined amount. When the height of the particle layer varies, the largest height and the smallest height are measured and the average of these is regarded to be the height h.

<Second solid-phase polymerization (solid-phase polymerization of (iii))>

Next, in the second solid-phase polymerization reaction, the solid-phase polymer after the first solid-phase polymerization reaction is further solid-phase polymerized to prepare an aromatic polyamide having an intrinsic viscosity $[\eta]_3$ of from 0.15 to 1.1 dl/g and a ratio $[\eta]_3/[\eta]_2$ that is larger than 1. Though there is no particular limitation on the temperature of the solid-phase polymerization, the reaction is usually conducted at a temperature of from 205 to 280° C., preferably, from 205 to 275° C. and, more preferably, from 210 to 270° C. for 0.1 to 6 hours, preferably, for 0.3 to 5 hours and, more preferably, for 0.5 to 4 hours. When the temperature is higher than 280° C., the melting point of the product is so close to this value that the solid-phase polymer give agglomerates during the reaction, and the solid-phase polymerization is not continued any longer.

Like the first solid-phase polymerization reaction, the second solid-phase polymerization reaction can be conducted by either the continuous method or the batch method. It is, however, desired that the second solid-phase polymerization reaction is conducted by the continuous method. Like the first solid-phase polymerization reaction, furthermore, the second solid-phase polymerization reaction can be carried out in either vacuum or in a gas stream. It is particularly preferred that the second solid-phase polymerization is conducted while feeding an inert gas from a position of a height of 0 to 0.8 times as high and, preferably, 0 to 0.5 times as high as the height h of the particle layer formed of the solid-phase polymer at a rate of 0.1 to 10 Nm³/hr, preferably 0.14 to 10 Nm³/hr, per kilogram of the solid-phase polymerized product. The height h of the particle layer is defined in the same manner as described above.

Upon conducting the second solid-phase polymerization, there is obtained an aromatic polyamide having an intrinsic viscosity $[\eta]_3$ of from 0.15 to 1.1 dl/g, preferably, from 0.17 to 1.1 dl/g, more preferably, from 0.20 to 1.1 dl/g, further preferably, from 0.25 to 1.05 dl/g and, particularly preferably, from 0.25 to 0.9 dl/g. When the aromatic polyamide is to be further melt-polymerized (iv), the above-mentioned range is preferred from the standpoint of stably conducting the operation.

Upon conducting the solid-phase polymerization through the first step of solid-phase polymerization and the second step of solid-phase polymerization according to the present invention, it is possible to prevent the polymer from being give agglomerated due to the water of condensation formed during the solid-phase polymerization.

In conducting the solid-phase polymerization, furthermore, it is desired that the region for conducting the solid-phase polymerization of the step (ii) is substantially coupled to the region for conducting the solid-phase polymerization of the step (iii).

The region for conducting the solid-phase polymerization of the step (ii) that is substantially coupled to the region for conducting the solid-phase polymerization of the step (iii), stands for that there exists a path along which the solid-phase polymer of polyamide after the solid-phase polymerization in the step (ii) is sent to the region for conducting the solid-phase polymerization in the step (iii) without once going out of the system. For example, the solid-phase polymerization vessel A used for the solid-phase polymerization of the step (ii) and the solid-phase polymerization vessel B used for the solid-phase polymerization of the step (iii) may be coupled together at the discharge port of the solid-phase polymerization vessel A and at the feed port of the solid-phase polymerization vessel B. When the solid-phase polymerization is conducted in a single reaction vessel, e.g., in a tubular reaction vessel, the former half of the tube may be the region for conducting the solid-phase polymerization of the step (ii) and the latter half of the tube may be the region for conducting the solid-phase polymerization of the step (iii). In such a case, the efficiency can be further increased.

According to the present invention, furthermore, controlling the temperature pattern during the solid-phase polymerization can be preferably adapted to the preparation of a polyamide that includes a long-chain diamine as a diamine component unit in addition to the preparation of an aromatic polyamide that includes a cyclic dicarboxylic acid component unit as in the present invention. Moreover, the solid-phase polymerization can be further adapted to the preparation of a polyamide maintaining the reaction rate comparable to that of the preparation of the aromatic polyamide of the present invention.

Melt-polymerization of an Aromatic Polyamide Precursor

According to the present invention, depending upon the cases, the obtained aromatic polyamide is melt-polymerized to prepare an aromatic polyamide having a high degree of polymerization. The melt-polymerization is carried out to effect the polycondensation while melting the aromatic polyamide precursor and imparting a shearing stress thereto. Such a melt-polymerization is effected, for example, by using a biaxial extruder with a vent, a kneader or the Brabender.

The temperature of the melt-polymerization is from 300 to 390° C. and, preferably, from 310 to 380° C. When the above-mentioned apparatus are used, it is desired that the melt residence time of the aromatic polyamide during the melt-polymerization is from 10 to 300 seconds and, preferably, from 15 to 240 seconds.

The thus obtained aromatic polyamide has an intrinsic viscosity $[\eta]_4$ of from 0.8 to 2.5 dl/g and, preferably, from 0.8 to 2.0 dl/g, and a glass transition temperature of from 70 to 125° C. and, preferably, from 80 to 125° C. When the polyamide precursor has an intrinsic viscosity of $[\eta]_3$ and the polyamide after the melt-polymerization has an intrinsic viscosity $[\eta]_4$, then it is desired that $$[\eta]_4/[\eta]_3 > 1.$$

Such an aromatic polyamide is crystalline and has a melting point of from 260 to 360° C. and, preferably, from 280 to 330° C.

The thus obtained aromatic polyamide exhibits an excellent hue. By using this aromatic polyamide, an article can be efficiently molded with contaminating the metal mold little.

According to the preparation process of the present invention, furthermore, there may be added, as required, widely known additives such as a coloring agent, ultraviolet-ray absorbing agent, photo-stabilizer, antioxidizing agent, antistatic agent, flame-retarding agent, crystallization-promoting agent, plasticizer and lubricant. These additives may be added during the preparation of a low-degree condensation product, during the solid-phase polymerization or during the melt-polymerization.

The thus obtained aromatic polyamide can be used in a system that is reinforced by being blended with a glass fiber, carbon fiber or inorganic powdery filler, or in the form of an alloy with other polymers by employing a molding method such as injection molding, blow molding, extrusion molding, compression molding, drawing or vacuum molding. The aromatic polyamide can be further used as an engineering plastic in the form of not only ordinary molded articles but also films, fibers and the like, and can be favorably used as a material for industrial use and domestic use.

According to the process for preparing aromatic polyamides of the present invention, the solid low-degree condensation product of an aromatic polyamide is heated at a temperature of not higher than 195° C. to effect the first solid-phase polymerization, and is then effected the second solid-phase polymerization. Thus, the aromatic polyamide is economically and efficiently prepared preventing the low-degree condensation product from being give agglomerates.

EXAMPLES

The invention will now be described by way of Working Examples to which only, however, the invention is in no way limited. Here, the intrinsic viscosity was measured according to a method described below.

Intrinsic viscosity $[\eta]$: Inherent viscosities ($\eta$ inh) of samples having concentrations of 1 g/dl, 0.3 g/dl and 0.1 g/dl were measured in the concentrated sulfuric acid at 30° C., and were extrapolated to a concentration 0 to find an intrinsic viscosity $[\eta]$.

$$\eta\text{inh} = \{1n(t_1/t_0)\}/C$$

wherein $\eta$ inh is an inherent viscosity (dl/g), $t_0$ is a flow-down time (sec) of the solvent, $t_1$ is a flow-down time (sec) of the sample solution, and C is a concentration (g/dl) of the sample in the solution.

Reference Example 1

Preparation of a Low-degree Condensation Product of an Aromatic Polyamide 58.5 Kilograms (503 mols) of a 1,6-diaminohexane, 58.1 kg (350 mols) of a terephthalic acid, 24.9 kg (150 mols) of an isophthalic acid, 106 g (1.00 mol) of sodium hydrophosphite as a catalyst, 763 g (6.25 mols) of benzoic acid as a terminating agent, and 14 liters of water were fed into a 200-liter reaction vessel and, after purged with nitrogen, were reacted under the conditions of 250° C. and 35 kg/cm² for one hour.

After one hour has passed, the reaction product formed in the reaction vessel was flushed into the open air through a nozzle to take it out in a solid form which was then dried to obtain a solid low-degree condensation product of an aromatic polyamide in an amount of 164 kg. The low-degree condensation product of the aromatic polyamide exhibited an intrinsic viscosity $[\eta]_1$ of 0.10 dl/g.

The low-degree condensation product could be easily taken out without being adhered to the wall surfaces or to the discharge port.

Example 1

Solid-phase Polymerization

40 Kilograms of the low-degree condensation product of the aromatic polyamide obtained in Reference Example 1 was thrown into a drying machine (Paddle Drier manufactured by Nara Kikai Seisakusho Co.) having an effective volume of 0.065 m³. The low-degree condensation product of the aromatic polyamide was heated up to 175° C. over a period of 120 minutes while rotating the paddle at 30 rpm and flowing nitrogen at a flow rate of 5.7 Nm³/hr. The low-degree condensation product of the aromatic polyamide was then maintained at a temperature not higher than 190° C. for 60 minutes to thereby execute the first solid-phase polymerization.

Next, the polymer obtained through the first solid-phase polymerization was heated up to 205° C. over a period of 32 minutes to execute the second solid-phase polymerization in order to obtain an aromatic polyamide precursor in an amount of 36 kg. The obtained aromatic polyamide precursor exhibited an intrinsic viscosity $[\eta]_3$ of 0.67 dl/g.

Preparation of an Aromatic Polyamide

The aromatic polyamide precursor was continuously supplied at a rate of 100 kg/hr into a biaxial extruder having a diameter of 57 mm of which the cylinder was maintained at a temperature of 365° C. and the screw was rotated at 280 rpm, to obtain an aromatic polyamide through the melt-polycondensation.

The obtained aromatic polyamide exhibited an intrinsic viscosity $[\eta]_4$ of 1.06 dl/g and a melting point of 330° C.

Comparative Example 1

In Example 1, the low-degree condensation product of the aromatic polyamide was heated up to 175° C. over a period of 120 minutes, and was maintained at the polycondensation temperature of not higher than 190° C. for minutes to execute the first solid-phase polymerization, and was then subjected to the second solid-phase polymerization in the same manner as in Example 1. However, the polymer melted before the temperature was raised to 205° C. in the second solid-phase polymerizathon, and the second solid-phase polymerization could not be continued.

Examples 2 and 3

Aromatic polyamides were obtained through the melt-polymerization by conducting the solid-phase polymerization and by preparing aromatic polyamide precursors in the same manner as in Example 1 but raising the temperature and setting the reaction time as shown in Table 1. The obtained aromatic polyamides exhibited limiting viscosities $[\eta]_4$ as shown in Table 1.

TABLE 1

|  | Example 1 | Example 2 | Example 3 | Comparative Example 1 |
|---|---|---|---|---|
| Solid-phase polymerization | | | | |
| 1st | | | | |
| time for raising to 175° C. (min.) | 120 | 90 | 60 | 90 |
| reaction time at 175–190° C. (min.) | 60 | 30 | 120 | 5 |
| 2nd | | | | |
| time for raiding to 205° C. (min.) | 32 | 96 | 17 | 11*1 |
| reaction time at 205° C. or higher (min.) | 105 | 30 | 115 | 0 |
| Giving agglomerates during solid-phase reaction | | | | |
| 1st solid-phase polymerization | none | none | none | none |
| 2nd solid-phase polymerization | none | none | none | yes |
| Difference of intrinsic viscosity between low-degree product and 1st solid-phase polymerized product $[\eta]_2 - [\eta]_1$ (dl/g) | 0.04 | 0.03 | 0.04 | 0.01 |
| Intrinsic viscosity of aromatic polyamide precursor after 2nd solid-phase polymerization $[\eta]_3$ (dl/g) | 0.67 | 0.30 | 0.95 | X*2 |
| Intrinsic viscosity of aromatic polyamide after melt-polymerization $[\eta]_4$ (dl/g) | 1.06 | 1.00 | 1.11 | X*2 |

*1 Time until the solid-phase polymerized product was heated up to 200° C. (melted when 200° C. was reached, and solid-phase polymerization was interrupted).
*2 The second solid-phase polymerized product was not formed and could not be measured.

Example 4

First and Second Solid-phase Polymerizations

The low-degree condensation product of the polyamide obtained in Reference Example 1 was continuously fed at a rate of 45 kg/hr into a drying machine having an effective volume of 350 liters and in which the first solid-phase polymerization zone had been formed up to a position of 80% from the starting material throw port toward the product discharge port, and the second solid-phase polymerization zone had been formed in the rest of 20% of the machine. While rotating the paddle at 20 rpm and flowing nitrogen at a rate of 60 Nm³/hr, the low-degree condensation product of the polyamide was continuously solid-phase polymerized for nine hours, i.e., was heated at 180° C. and stirred in the first solid-phase polymerization zone, and was heated at 205° C. and was stirred in the second solid-phase polymerization zone, thereby to obtain a second solid-phase polymerized product in an amount of 200 kg.

The thus obtained second solid-phase polymerized product exhibited an intrinsic viscosity $[\eta]_3$ of 0.28 dl/g.

The solid-phase polymerized product which was sampled from the sampling hole provided at a position of 80% from the starting material throw port forward the product discharge port, exhibited an intrinsic viscosity $[\eta]_2$ of 0.15 dl/g.

Melt-polycondensation

An aromatic polyamide was obtained through the melt-polycondensation by continuously feeding the second solid-phase polymerized product obtained through the above-mentioned solid-phase polymerization at a rate of 75 kg/hr into a biaxial extruder having a diameter of 57 mm of which the cylinder temperature was maintained at 365° C. and the screw was rotated at 280 rpm. The obtained polyamide exhibited an intrinsic viscosity $[\eta]_4$ of 1.02 dl/g.

What is claimed is:

1. A process for preparing an aromatic polyamide which comprises:

(A) a dicarboxylic acid component unit comprising 30 to 100 mol % of a terephthalic acid component unit, and, as required, 0 to 70 mol % of a cyclic dicarboxylic acid component unit other than the terephthalic acid and, as required, 0 to 15 mol % of an aliphatic dicarboxylic acid having 7 to 20 carbon atoms; and (B) a diamine unit comprising 50 to 100 mol % of a component unit derived from an aliphatic alkylene diamine having 4 to 25 carbon atoms, and 0 to 50 mol % of a component unit derived from an alicyclic diamine having 3 to 25 carbon atoms; said process comprising:

a step (i) of preparing a solid low-degree condensation product having an intrinsic viscosity $\eta_1$ of from 0.05 to 0.2 dl/g by the polycondensation reaction of the dicarboxylic acid with the diamine;

a step (ii) of solid-phase polymerizing said low-degree condensation product at a temperature of not higher than 195° C. to prepare a solid-phase polymerized product having an intrinsic viscosity $\eta_2$ satisfying the following relationship [I], $$\eta_2 - \eta_1 = 0.02 \text{ to } 0.1 \text{ dl/g} \quad [I]$$

and;

a step (iii) of further solid-phase polymerizing said solid-phase polymerized product, at a temperature of from 205 to 280° C., to obtain an aromatic polyamide having an intrinsic viscosity $\eta_3$ of from 0.15 to 1.1 dl/g and a ratio $\eta_3/\eta_2$ of larger than 1.0.

2. A process for preparing an aromatic polyamide according to claim 1, further containing a step (iv) of melt-polymerizing the aromatic polyamide obtained in the step (iii) to prepare an aromatic polyamide having an intrinsic viscosity $[\eta]_4$ of from 0.8 to 2.5 dl/g.

3. A process for preparing an aromatic polyamide according to claim 1, wherein a particle layer is formed by using the solid low-degree condensation product obtained in said step (i), and the solid-phase polymerization in the step (ii) is carried out while supplying an inert gas to a position 0 to 0.8 times as high as a height (h) of the particle layer at a rate of from 0.1 to 10 Nm³/hr per kilogram of the low-degree condensation product.

4. A process for preparing an aromatic polyamide according to claim 1, wherein a particle layer is formed by using the solid-phase polymer obtained in said step (ii), and the solid-phase polymerization in the step (iii) is carried out while supplying an inert gas to a position 0 to 0.8 times as high as the height (h) of the particle layer at a rate of from 0.1 to 10 Nm$^3$/hr per kilogram of the solid-phase polymerized product to obtain an aromatic polyamide having an intrinsic viscosity $[\eta]_3$ of from 0.15 to 1.1 dl/g.

5. A process for preparing an aromatic polyamide according to claim 1, wherein the low-degree condensation product is continuously supplied to a region where the solid-phase polymerization of the step (ii) is carried out and the polyamide obtained in the step (iii) is continuously discharged from a region where the solid-phase polymerization of the step (iii) is carried out.

* * * * *